United States Patent
Yoshikawa et al.

(10) Patent No.: US 8,312,907 B2
(45) Date of Patent: Nov. 20, 2012

(54) FIBER BUNDLE ARRANGING DEVICE AND FIBER BUNDLE ARRANGING METHOD

(75) Inventors: Genki Yoshikawa, Kariya (JP); Junji Takeuchi, Kariya (JP); Yoshiharu Yasui, Kariya (JP)

(73) Assignee: Kabushiki Kaisha Toyota Jidoshokki, Kariya-shi, Aichi-Ken (JP)

( * ) Notice: Subject to any disclaimer, the term of this patent is extended or adjusted under 35 U.S.C. 154(b) by 300 days.

(21) Appl. No.: 12/601,209

(22) PCT Filed: May 19, 2008

(86) PCT No.: PCT/JP2008/059115
§ 371 (c)(1),
(2), (4) Date: Nov. 20, 2009

(87) PCT Pub. No.: WO2008/143206
PCT Pub. Date: Nov. 27, 2008

(65) Prior Publication Data
US 2010/0170628 A1   Jul. 8, 2010

(30) Foreign Application Priority Data
May 21, 2007   (JP) ................................ 2007-134289

(51) Int. Cl.
*D03D 41/00*   (2006.01)
*B29C 70/22*   (2006.01)
*B29C 70/24*   (2006.01)

(52) U.S. Cl. ............. 156/393; 156/580; 156/93; 139/11

(58) Field of Classification Search .................... 156/93, 156/148, 393, 510, 580; 442/205, 206, 207; 28/149; 139/11, 383 R, 384 R
See application file for complete search history.

(56) References Cited

U.S. PATENT DOCUMENTS
5,772,821 A   6/1998   Yasui et al.
5,833,802 A   11/1998   Yasui et al.

FOREIGN PATENT DOCUMENTS
JP   08-218249 A   8/1996
JP   200-199151 A   7/2000
JP   2007-016347 A   1/2007

OTHER PUBLICATIONS
Abstract and Machine Translation for JP 2000-199151 A. Date Unknown.*
International Search Report issued on Jun. 17, 2008, for international application No. PCT/JP2008/059115.
International Preliminary Report on Patentability issued on Jan. 12, 2010, for the corresponding PCT Application No. PCT/JP2008/059115.

* cited by examiner

*Primary Examiner* — Michael Tolin
(74) *Attorney, Agent, or Firm* — Locke Lord LLP

(57) ABSTRACT

A fiber bundle arranging device is provided that laminates fiber bundle layers formed of a fiber bundle. The fiber bundle is engaged with arranged pins to have straight parts. The device includes a press roller and a first moving device. The press roller includes a peripheral portion. The peripheral portion of the press roller depresses the straight parts of the fiber bundle engaged with the pins toward the roots of the pins in the vicinity of the pin. The first moving device moves the press roller in the arrangement direction of the pins such that the peripheral portion sequentially intersects the straight parts of the fiber bundle. The peripheral portion is located in the front of the press roller in the moving direction, and the press roller is moved to sequentially intersect the straight parts of the fiber bundle while being inclined such that, toward the front end in the moving direction of the press roller, the distance from the roots of the pins in the laminating direction of the fiber bundle layers increases.

7 Claims, 12 Drawing Sheets

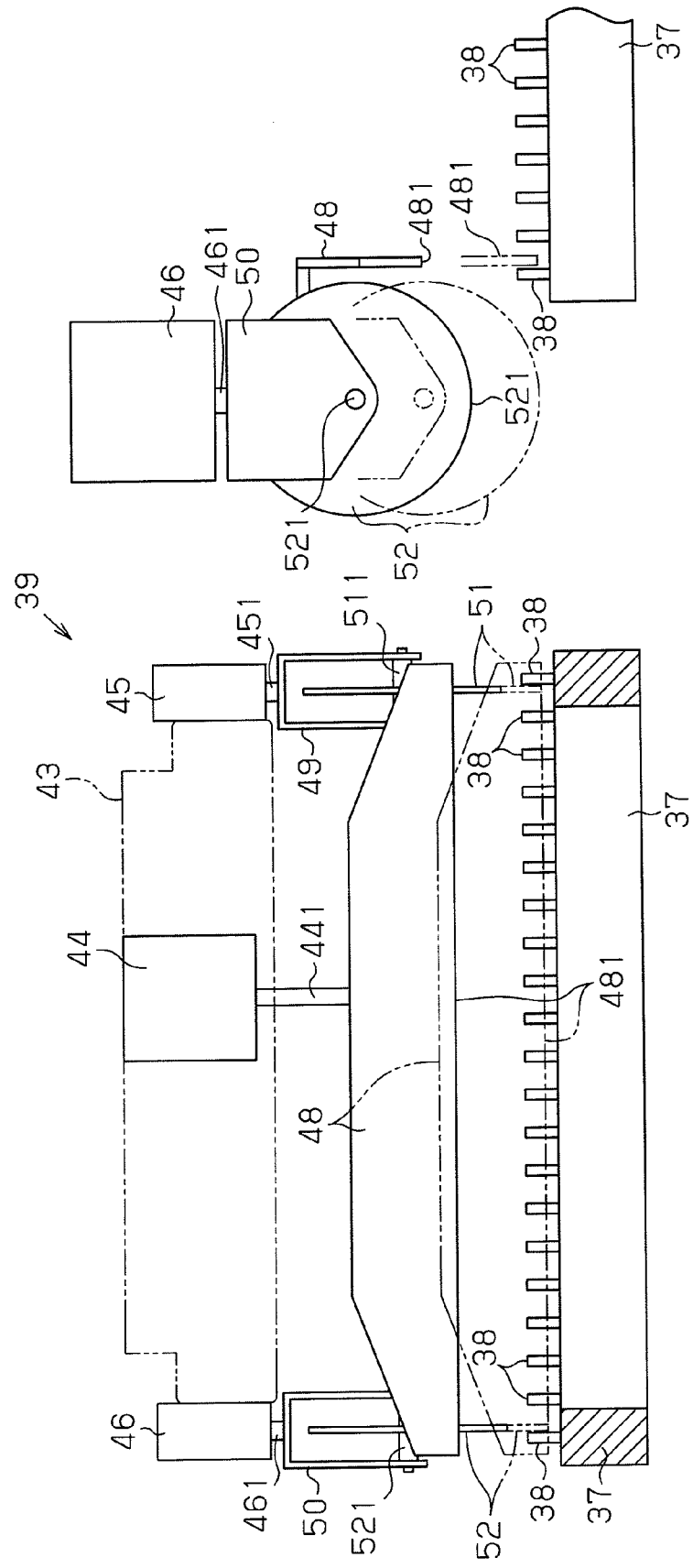

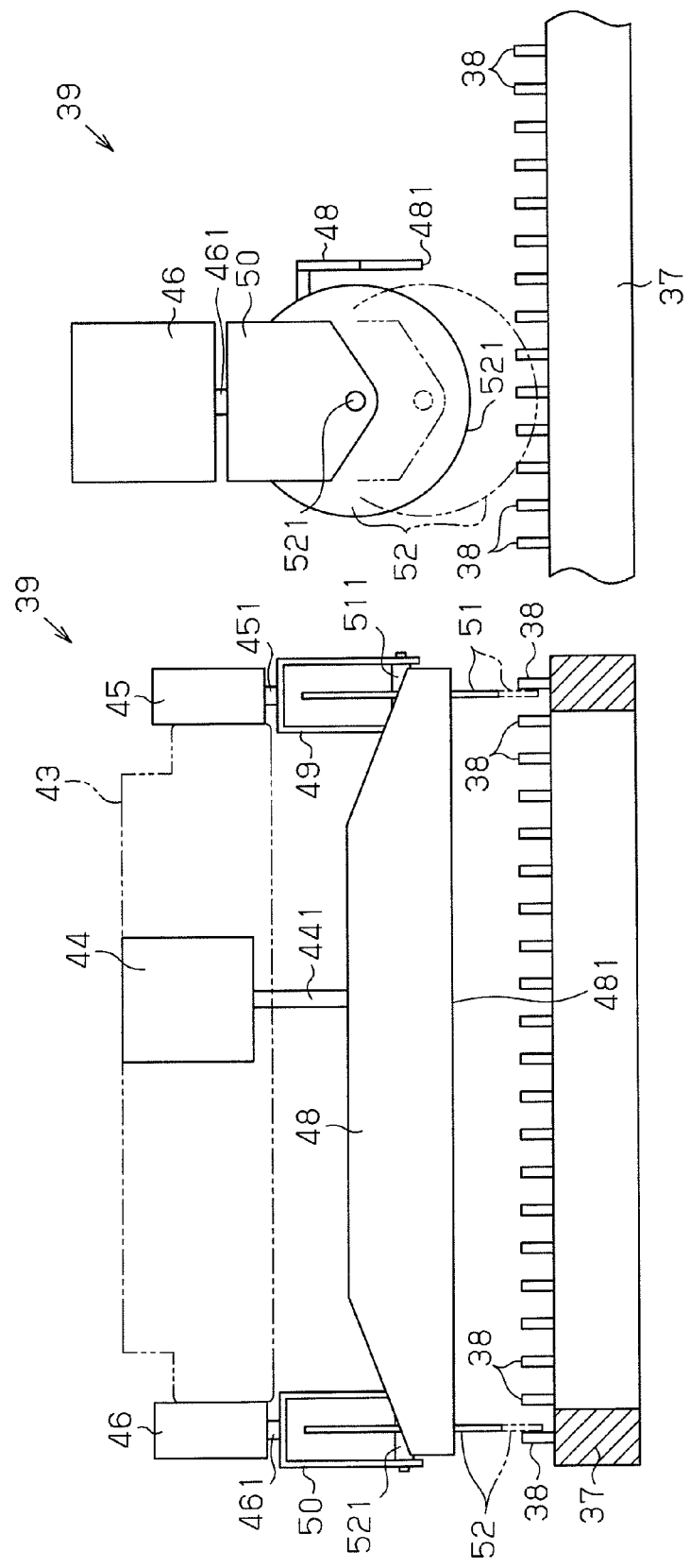

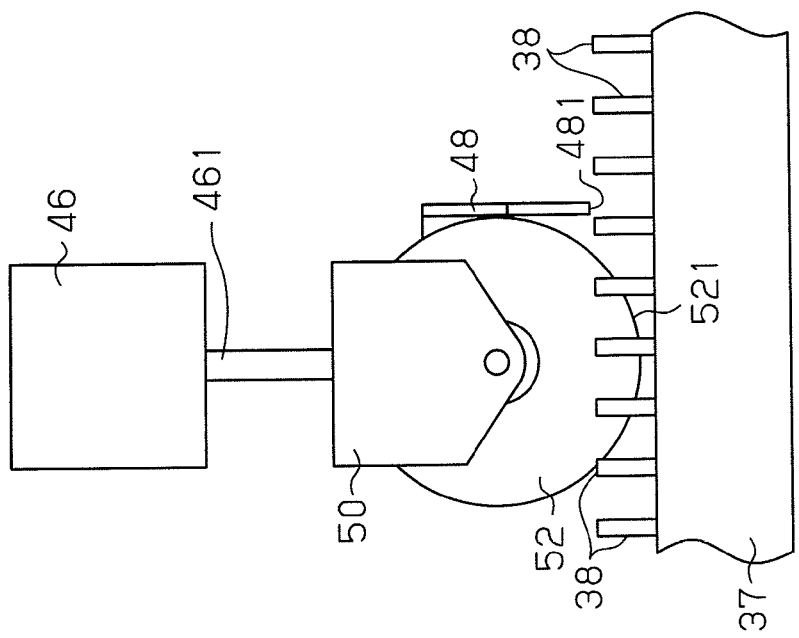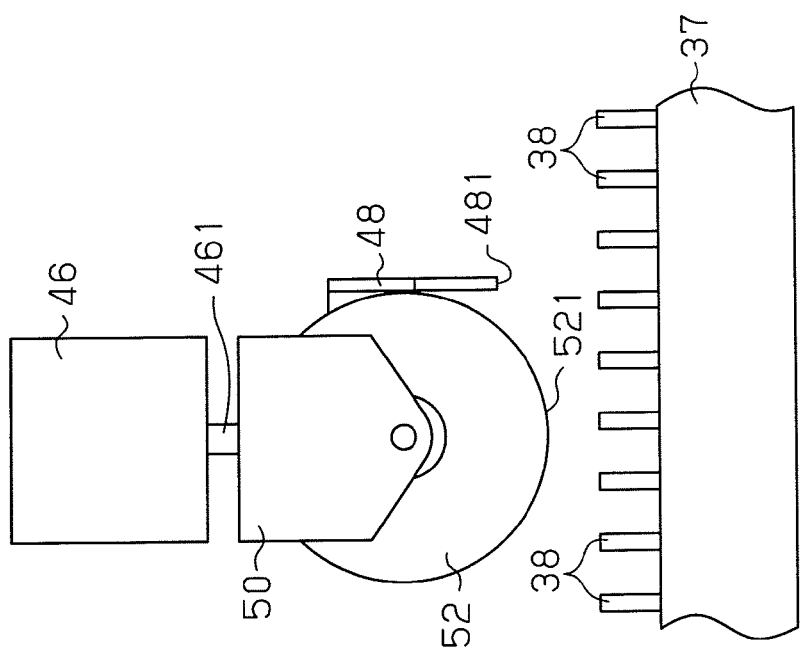

FIBER BUNDLE ARRANGING DEVICE AND FIBER BUNDLE ARRANGING METHOD

This application claims the benefit of International Application Number PCT/JP2008/059115 filed on May 19, 2008 under 35 USC §371, entitled, "FIBER BUNDLE ARRANGING DEVICE AND FIBER BUNDLE ARRANGING METHOD" which claims the benefit of Japanese Patent Application Number JP 2007-134289, filed on May 21, 2007, all of which are hereby incorporated by reference.

FIELD OF THE INVENTION

The present invention relates to a fiber bundle arranging device and a fiber bundle arranging method that arrange a fiber bundle by drawing out the fiber bundle from a guide hole of a guide pipe by moving the guide pipe with the fiber bundle being engaged with arranged pins.

BACKGROUND OF THE INVENTION

Conventionally, composites that use three-dimensional fabric (three-dimensional fiber structure) as reinforcing material have been proposed as fiber-reinforced composites, which are widely used as light structural material. The fiber-reinforced composites have extremely high strength, and are used as part of structural material of, for example, aircraft. As a method for producing the three-dimensional fiber structure used in the reinforcing material of the fiber-reinforced composites, a method has been proposed in which a fiber bundle lamination is formed by laminating fiber bundle layers, each of which is formed by folding back a fiber bundle, to be at least biaxially oriented, and the fiber bundle lamination is connected by a thickness direction thread arranged perpendicular to the fiber bundle layers. Patent Documents 1 and 2 each disclose a fiber bundle arranging device that forms fiber bundle layers by feeding a fiber bundle from a guide pipe, which moves along an arranging surface, and arranging the fiber bundle to be folded back and forth between pins arranged at a predetermined pitch in a state where the fiber bundle is flat and the flat surface of the fiber bundle is arranged along the arranging surface.

From the aspect of the physical property of the three-dimensional fiber structure, the fiber density of the fiber bundle is preferably high. To increase the fiber density of the fiber bundle, fiber bundle array engaged with the pins may be depressed toward the roots of the pins in the vicinity of the pins. For example, depression means including a press plate and a pair of press blocks as disclosed in Patent Document 1 has been proposed as a depressing mechanism. The press plate and the pair of press blocks have lengths substantially equal to the length of the array of pins arranged in one direction. The press plate and the pair of press blocks press the fiber bundle at once along the entire length of the array of pins.

However, since the depression means disclosed in Patent Document 1 has the length substantially equal to the length of the array of pins, the fiber bundle arranging device is disadvantageously large.

Furthermore, the depression means disclosed in Patent Document 1 is not placed at the position where pressing operation should be performed while the fiber bundle is being arranged. Thus, the depression means needs to be placed at the position where pressing operation should be performed after arranging the fiber bundle corresponding to one layer of the fiber bundle layers. With this procedure, however, time is taken to form the fiber bundle layers including the pressing operation.

Patent Document 1: Japanese Laid-Open Patent Publication No. 8-218249
Patent Document 2: Japanese Laid-Open Patent Publication No. 2007-16347

SUMMARY OF THE INVENTION

A first objective of the present invention is to reduce the size of a fiber bundle arranging device. A second objective of the present invention is to permit a fiber bundle to be pressed while arranging the fiber bundle during at least part of the period of arranging the fiber bundle of one fiber bundle layer.

To achieve the above objective, a first aspect of the present invention provides a fiber bundle arranging device for laminating fiber bundle layers formed of a fiber bundle. The fiber bundle is engaged with arranged pins to have straight parts. The device includes a pressing member and a first moving device. The pressing member includes a pressing portion. The pressing portion depresses the straight parts of the fiber bundle engaged with the pins toward the roots of the pins in the vicinity of the pins. The first moving device moves the pressing member in the arrangement direction of the pins such that the pressing portion sequentially intersects the straight parts of the fiber bundle. The pressing portion is located in the front of the pressing member in the moving direction, and the pressing portion is moved to sequentially intersect the straight parts of the fiber bundle while being inclined such that, toward the end in the moving direction, the distance from the roots of the pins in the laminating direction of the fiber bundle layers increases.

A second aspect of the present invention provides a fiber bundle arranging method for laminating fiber bundle layers formed of a fiber bundle. The fiber bundle is engaged with arranged pins to have straight parts. The method includes: preparing a pressing member including a pressing portion, the pressing portion being located in the front of the pressing member in the moving direction; depressing the straight parts of the fiber bundle by the pressing portion toward the roots of the pins in the vicinity of the pins while moving the pressing member in the arrangement direction of the pins such that the pressing portion sequentially intersects the straight parts of the fiber bundle; and tilting the pressing portion such that, toward the end in the moving direction, the distance from the roots of the pins in the laminating direction of the fiber bundle layers increases.

BRIEF DESCRIPTION OF THE DRAWINGS

FIG. 7(a) is a partial front view illustrating the pressing device of FIG. 3(b);

FIG. 7(b) is a partial side view illustrating the pressing device of FIG. 3(b);

FIG. 9(a) is a partial front view illustrating the pressing device of FIG. 3(b);

FIG. 9(b) is a partial side view illustrating the pressing device of FIG. 3(b);

FIGS. 10(a) and 10(b) are enlarged partial side views illustrating the pressing device;

DETAILED DESCRIPTION OF THE PREFERRED EMBODIMENTS

Figure 1:
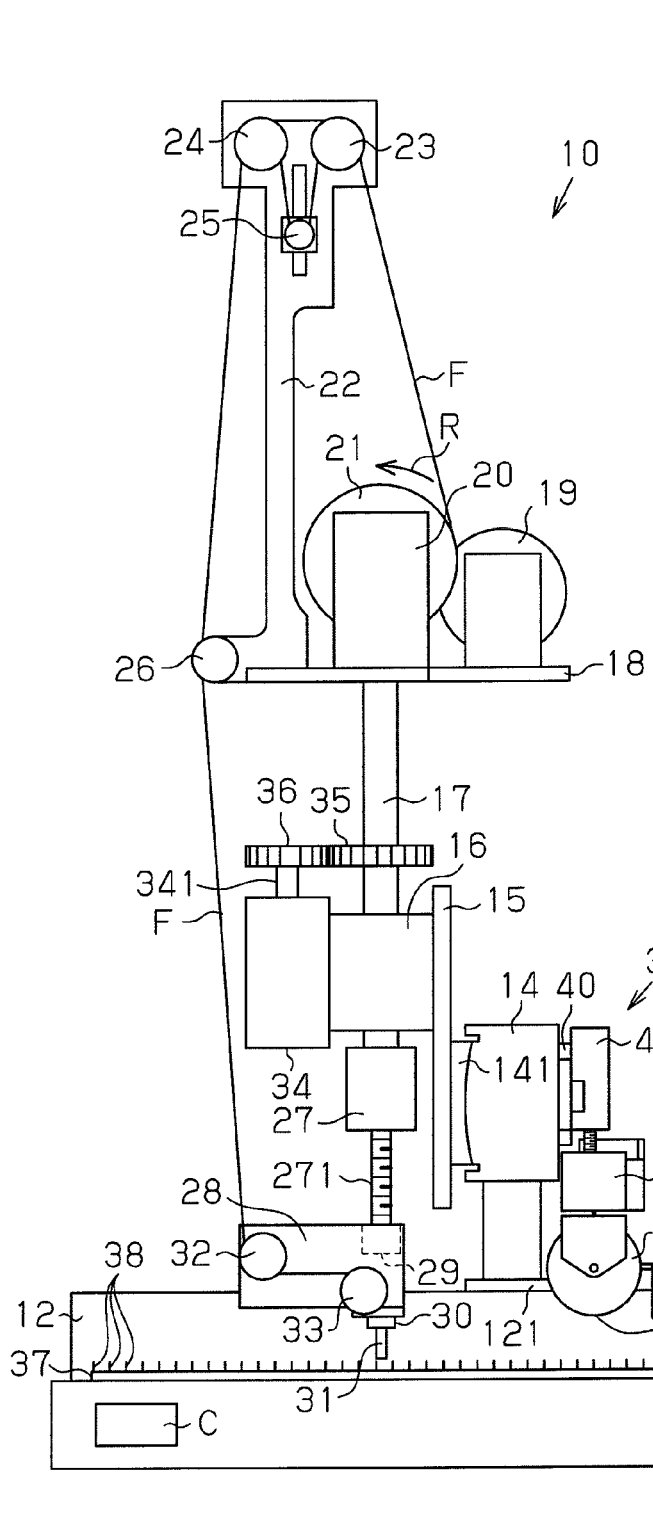
FIG. 1(a) is a side view illustrating a fiber bundle arranging device according to a first embodiment of the present invention.
FIG. 1(b) is an enlarged partial side view illustrating the fiber bundle arranging device of FIG. 1(a)
Figure 1:
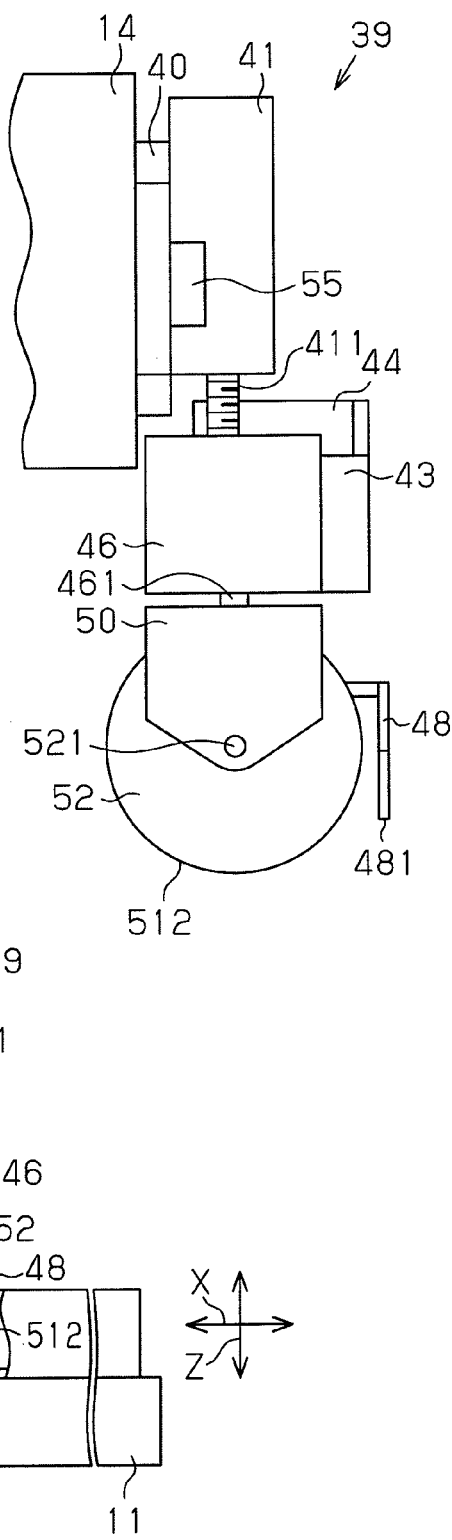

A first embodiment of the present invention will now be described with reference to FIGS. 1 to 12. FIG. 1(a) shows the entirety of a fiber bundle arranging device 10 according to the present embodiment. The fiber bundle arranging device 10 is a device for producing a three-dimensional fabric.

Figure 2:
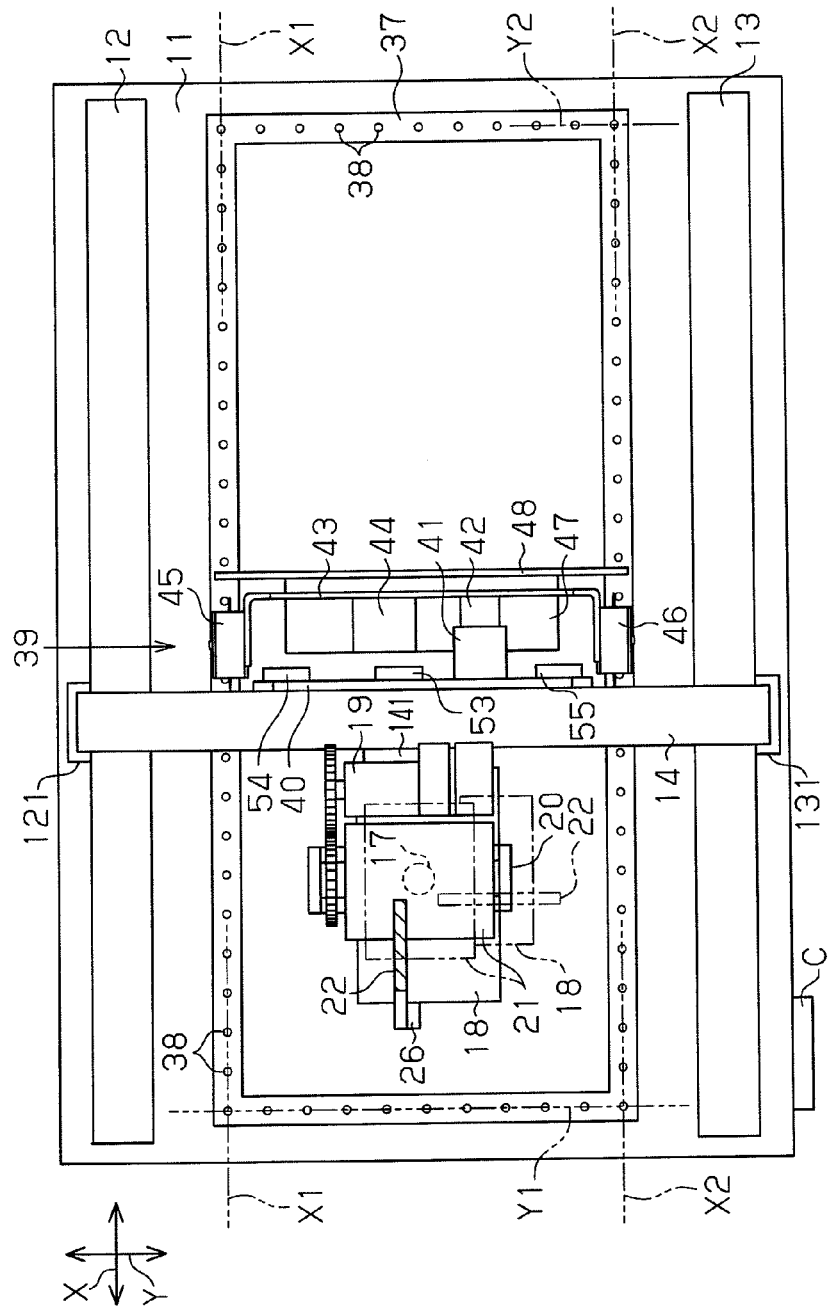
FIG. 2 is a plan view illustrating the fiber bundle arranging device of FIG. 1(a)
Figure 3:
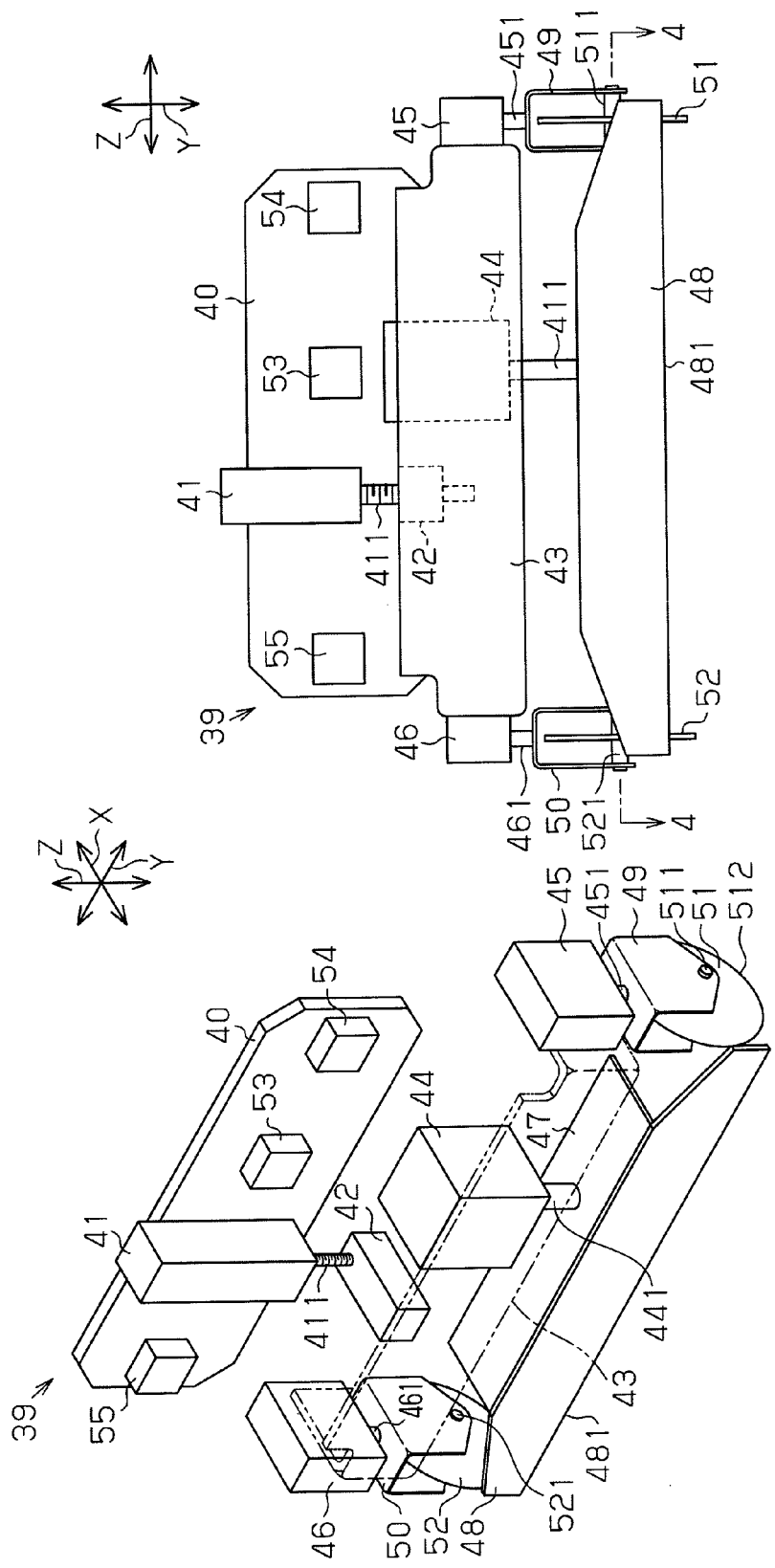
FIG. 3(a) is a perspective view illustrating a pressing device of the fiber bundle arranging device of FIG. 1(a)
FIG. 3(b) is a front view illustrating the pressing device of FIG. 3(a)
Figure 4:
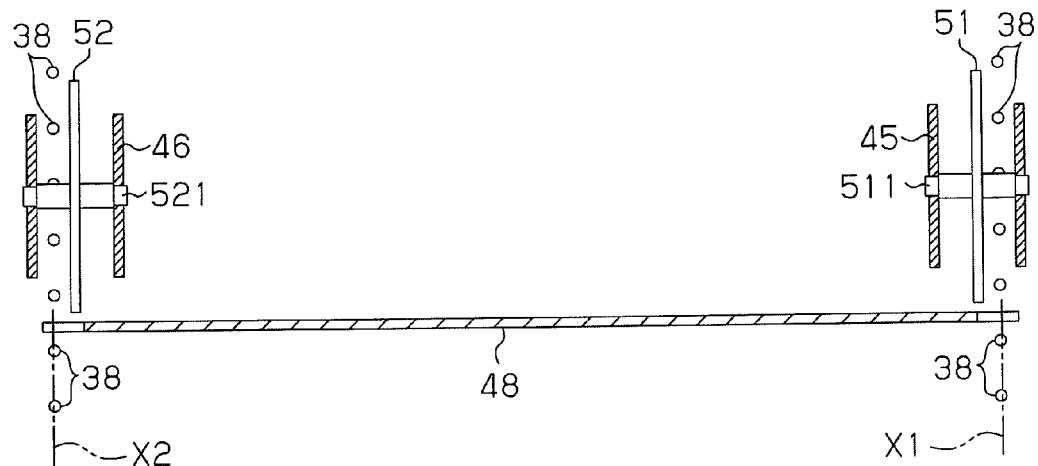
FIG. 4 is a cross-sectional view taken along line 4-4 of FIG. 3(b)

As shown in FIG. 2, a pair of linear sliders 12, 13 are provided on a rectangular base 11 to extend in a longitudinal direction of the base 11 (hereinafter, referred to as an X-axis direction). The linear slider 12 includes a ball screw mechanism (not shown), which includes a motor, and a first movable body 121, which is moved in the X-axis direction by operation of the ball screw mechanism. The linear slider 13 includes a ball screw mechanism (not shown), which includes a motor, and a first movable body 131, which is moved in the X-axis direction by the operation of the ball screw mechanism. In the linear sliders 12, 13, the ball screw mechanisms are operated in synchronization with each other, and the first movable bodies 121, 131 are moved in the X-axis direction in synchronization with each other.

A linear slider 14 is provided on the first movable bodies 121, 131 to extend in a direction perpendicular to the X-axis direction (hereinafter, referred to as a Y-axis direction). When the linear sliders 12, 13 are operated, the linear slider 14 is translated in the X-axis direction. The linear slider 14 includes a ball screw mechanism (not shown), which includes a motor, and a second movable body 141, which is moved in the Y-axis direction by the operation of the ball screw mechanism.

The linear sliders 12, 13, 14 are controlled by a control computer C.

As shown in FIG. 1(a), a support plate 15 is fastened to the second movable body 141, and a support frame 16 is fastened to the support plate 15. A support shaft 17 extends through the support frame 16 in the vertical direction (hereinafter, referred to as a Z-axis direction) to be rotatable about the axis of the support shaft 17. A mounting plate 18 is fastened to the upper part of the support shaft 17. A motor 19 and a bobbin holder 20 are supported on the mounting plate 18. A bobbin 21 formed by a fiber bundle F is mounted on the bobbin holder 20, and the bobbin 21 is rotated by the operation of the motor 19 in a direction to feed the fiber bundle F (the direction shown by arrow R in FIG. 1(a)). The fiber bundle F is formed by bundling monofilaments in a flat state without twisting them. The monofilaments of the present embodiment are carbon fibers. The operation of the motor 19 is controlled by the control computer C.

A support column 22 is vertically arranged on the mounting plate 18, and a pair of guide rollers 23, 24 are mounted on the upper part of the support column 22. A tension roller 25 is arranged below the guide rollers 23, 24 to be movable in the vertical direction. Also, a guide roller 26 is mounted on the lower part of the support column 22. The fiber bundle F fed from the bobbin 21 is guided downward of the mounting plate 18 by the guide rollers 23, 24, the tension roller 25, and the guide roller 26. The fiber bundle F is placed under proper tension by a tension applying mechanism including the tension roller 25.

A motor 34 is secured to the side of the support frame 16. A gear 35 is fastened to the support shaft 17, and a gear 36 is fastened to an output shaft 341 of the motor 34. The gear 36 is engaged with the gear 35, and when the motor 34 is operated, the support shaft 17 is rotated.

A motor 27 is secured to a projecting end of the support shaft 17, which projects downward from the support frame 16. An output shaft of the motor 27, which is a threaded shaft 271, extends in the Z-axis direction, and a support frame 28 is coupled to the threaded shaft 271 via a nut 29. The nut 29 is threaded to the threaded shaft 271, and when the motor 27 is operated, the support frame 28 is translated in the Z-axis direction with the nut 29. The operation of the motor 27 is controlled by the control computer C.

Figures 5A, 5B:
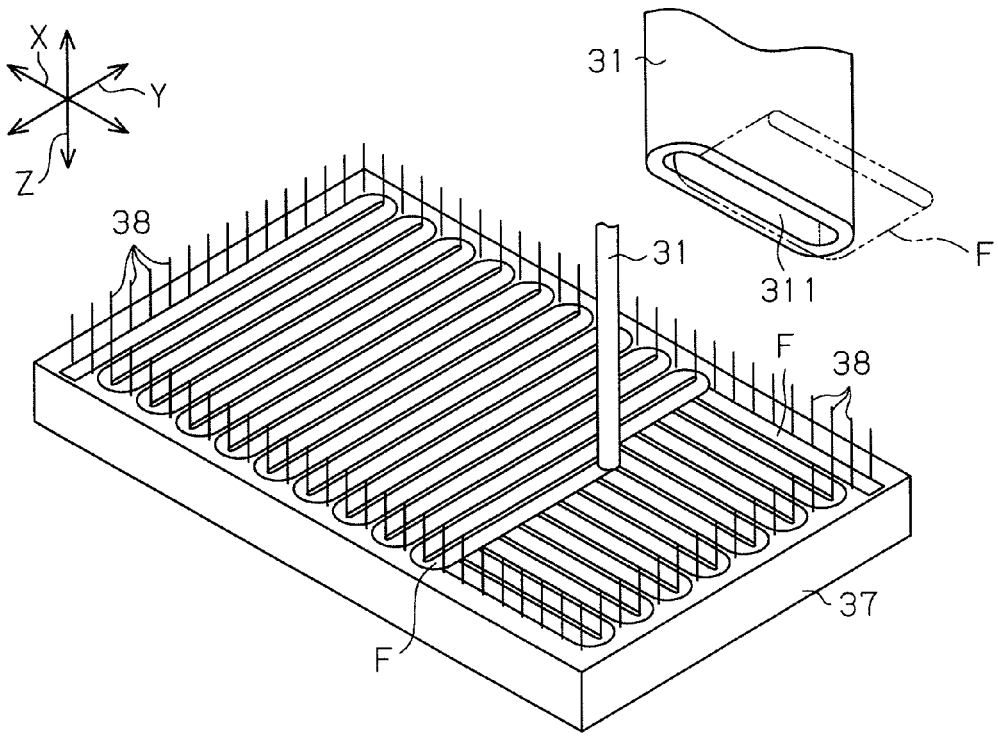
FIG. 5(a) is a perspective view illustrating an arrangement of the fiber bundle.
FIG. 5(b) is an enlarged partial perspective view illustrating a guide pipe.

An arrangement head 30 is attached to the lower part of the support frame 28. The arrangement head 30 includes a linear guide pipe 31 (guide member), which feeds the fiber bundle F. As shown in FIG. 5(b), a guide hole 311 in the guide pipe 31 is flat, and the guide pipe 31 feeds the fiber bundle F from the guide hole 311 in a flat form.

As shown in FIG. 1(a), guide rollers 32, 33 are mounted on the support frame 28. The fiber bundle F guided via the guide roller 26 is introduced into the guide pipe 31 via the guide rollers 32, 33.

As shown in FIG. 2, a frame 37 is placed on the base 11. The frame 37 is formed into a rectangular shape, and pins 38 are arranged on the upper surface of the frame 37 along the frame 37 at a predetermined pitch (for example, a pitch of a few millimeters). The pins 38 form parallel rows X1, X2, and parallel rows Y1, Y2. The rows X1, X2 are perpendicular to the rows Y1, Y2.

The guide pipe 31 shown in FIG. 1(a) is arranged at an appropriate height by the operation of the motor 27, and is moved in the X-axis direction, Y-axis direction, or bias direction (diagonal direction) by combination of the operation of the linear sliders 12, 13 and the operation of the linear slider 14. When the guide pipe 31 is moved in the X-axis direction, the Y-axis direction, or the bias direction, the fiber bundle F extending through the guide pipe 31 is fed out from the guide pipe 31 while being engaged with the pins 38. FIG. 5(a) shows an example of arranging the fiber bundle F while the fiber bundle F is engaged with the pins 38.

The linear sliders 12, 13, 14 configure a second moving device, which translates the guide pipe 31 in the X-axis direction, Y-axis direction, or bias direction. The linear sliders 12, 13 configure an X-axis moving part, which includes the first movable bodies 121, 131 linearly moved in the X-axis direction. The linear slider 14 configures a Y-axis moving part, which includes the second movable body 141 linearly moved in the Y-axis direction.

The orientation of the guide pipe 31 is adjusted by the operation of the motor 34 such that the flat surface of the guide pipe 31 faces in the moving direction of the guide pipe 31 except when engaging the fiber bundle F with the pins 38 by moving the guide pipe 31 to invert around the pins 38. The arranging state of the mounting plate 18 shown by the solid line in FIG. 2 is a state where the flat surface of the guide pipe 31 faces in the X-axis direction, and the arranging state of the mounting plate 18 shown by the chain line in FIG. 2 is a state where the flat surface of the guide pipe 31 faces in the Y-axis direction. In the state shown in FIG. 5(a), the flat surface of the guide pipe 31 faces in the Y-axis direction.

As shown in FIG. 1(b), a pressing device 39 is secured to the linear slider 14. The structure of the pressing device 39 will now be described.

As shown in FIG. 1(b), a base plate 40 is fastened to the linear slider 14, and a motor 41 is secured to the base plate 40. An output shaft of the motor 41, which is a threaded shaft 411, extends downward. As shown in FIGS. 3(a) and 3(b), a nut 42 is threaded to the threaded shaft 411, and a base frame 43 is fastened to the nut 42. When the motor 41 is actuated, the base frame 43 is translated in the Z-axis direction together with the nut 42. The motor 41 is controlled by the control computer C (see FIG. 1(a)).

Air cylinders 44, 45, 46 are secured to the base frame 43, and drive rods 441, 451, 461 of the air cylinders 44, 45, 46 extend downward. A support plate 47 is fastened to the drive rod 441, and a plate-like pressing bar 48 is fastened to the support plate 47. The plate-like pressing bar 48 extends along the surface including the Y-axis direction and the Z-axis direction, and a linear pressing edge 481 is formed at the lower part of the pressing bar 48 and extends in the Y-axis direction.

Shaft support brackets 49, 50 are fastened to the drive rods 451, 461 of the air cylinders 45, 46, and plate-like press rollers 51, 52 are supported by the shaft support brackets 49, 50 to be rotatable with the support shafts 511, 521. The plate-like press rollers 51, 52 are in the surface including the X-axis direction and the Z-axis direction. As shown in FIG. 2, the distance between the press rollers 51, 52, which serve as pressing members, is less than the distance between the row X1 of the pins 38 arranged in the X-axis direction and the row X2 of the pins 38 arranged in the X-axis direction. The length of the pressing edge 481 is greater than the distance between the row X1 of the pins 38 and the row X2 of the pins 38. As viewed from the Z-axis direction, the press roller 51 is parallel to the row X1 and located in the vicinity of the inner side of the pins 38 forming the row X1. Furthermore, as viewed from the Z-axis direction, the press roller 52 is parallel to the row X2 and located in the vicinity of the inner side of the pins 38 forming the row X2.

Electromagnetic three-way valves 53, 54, 55 are mounted on the base plate 40. The air cylinder 44 is connected to a pressure air supply source, which is not shown, via the electromagnetic three-way valve 53. The air cylinder 45 is connected to the pressure air supply source, which is not shown, via the electromagnetic three-way valve 54, and the air cylinder 46 is connected to the pressure air supply source, which is not shown, via the electromagnetic three-way valve 55. The electromagnetic three-way valves 53, 54, 55 are energized and de-energized by the control computer C.

When the electromagnetic three-way valve 53 is energized, pressurized air is supplied to the air cylinder 44. Then, the drive rod 441 extends and the pressing bar 48 moves downward. The extending amount of the drive rod 441 is constant. When the electromagnetic three-way valve 53 is switched to the de-energized state from the energized state, the pressurized air in the air cylinder 44 is discharged. Then, the drive rod 441 is retracted and the pressing bar 48 moves upward. When the electromagnetic three-way valve 54 is energized, pressurized air is supplied to the air cylinder 45. This causes the drive rod 451 to extend, so that the press roller 51 moves downward. When the electromagnetic three-way valve 54 is switched to the de-energized state from the energized state, the pressurized air in the air cylinder 45 is discharged. This retracts the drive rod 451 and moves the press roller 51 upward. When the electromagnetic three-way valve 55 is energized, pressurized air is supplied to the air cylinder 46. Then, the drive rod 461 extends and the press roller 52 moves downward. When the electromagnetic three-way valve 55 is switched to the de-energized state from the energized state, the pressurized air in the air cylinder 46 is discharged. This retracts the drive rod 461 and moves the press roller 52 upward. The extending amounts of the drive rods 451, 461 are the same and constant.

An example of control of pressing operation against the fiber bundle F performed by the pressing device 39 will now be described.

Figure 6A:
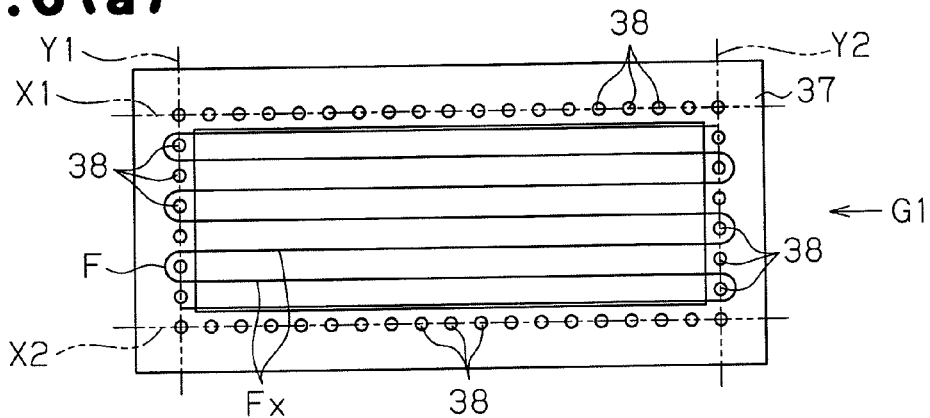
FIGS. 6(a), 6(b), 6(c), and 6(d) are simplified plan views illustrating arrangement pattern of the fiber bundle.

FIG. 6(a) shows an arranging pattern in which the fiber bundle F is arranged by moving the guide pipe 31 in the X-axis direction, and then reversing the motion of the guide pipe 31 such that the fiber bundle F is engaged with the pins 38 forming the rows Y1, Y2. When the fiber bundle F is engaged with all of predetermined pins 38 among the pins 38 forming the rows Y1, Y2 in the Y-axis direction, formation of a fiber bundle layer G1 in the arranging pattern shown in FIG. 6(a) is completed.

When the engagement of the fiber bundle F with all the predetermined pins 38 among the pins 38 forming the row Y1 is completed before the engagement with the pins 38 forming the row Y2, the pressing device 39 is arranged at a standby position shown in FIG. 7(b) by the operation of the linear sliders 12, 13 such that the pressing edge 481 of the pressing bar 48 is located in the vicinity of the inner side of the pins 38 forming the row Y1. When the pressing device 39 is arranged at the standby position shown in FIG. 7(b), the base frame 43 is arranged at an appropriate height by the operation of the motor 41. Subsequently, the electromagnetic three-way valve 53 is energized, and the pressing bar 48 moves downward. Then, the pressing edge 481 presses straight parts Fx (shown in FIG. 6(a)) of the fiber bundle F engaged with the pins 38 forming the row Y1 toward the roots of the pins 38. The states shown by the chain double-dashed line in FIGS. 7(a) and 7(b) are the states where the pressing bar 48 presses the fiber bundle F along the row Y1. The position of the pressing bar 48 shown by the chain double-dashed line in FIG. 7(a) is a pressing position where the fiber bundle F is pressed. Thereafter, the electromagnetic three-way valve 53 is de-energized so that the pressing bar 48 moves upward to a retracted position. The pressing bar 48 at the retracted position is shown by the solid line in FIG. 7(a).

Figure 8A:
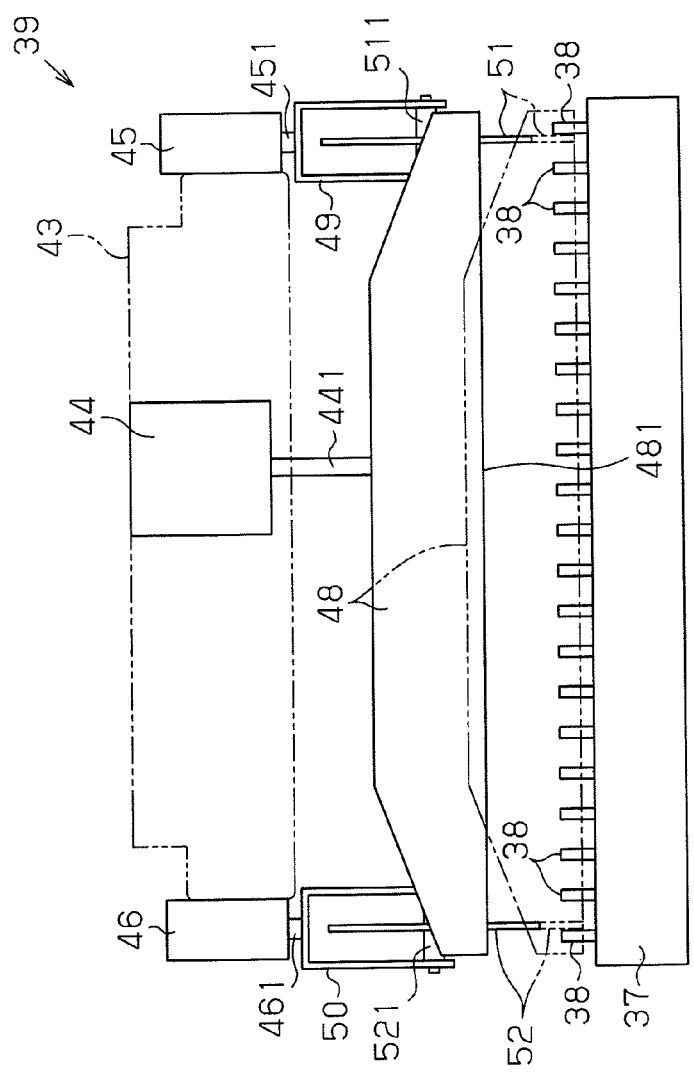
FIG. 8(a) is a partial front view illustrating the pressing device of FIG. 3(b)
Figure 8B:
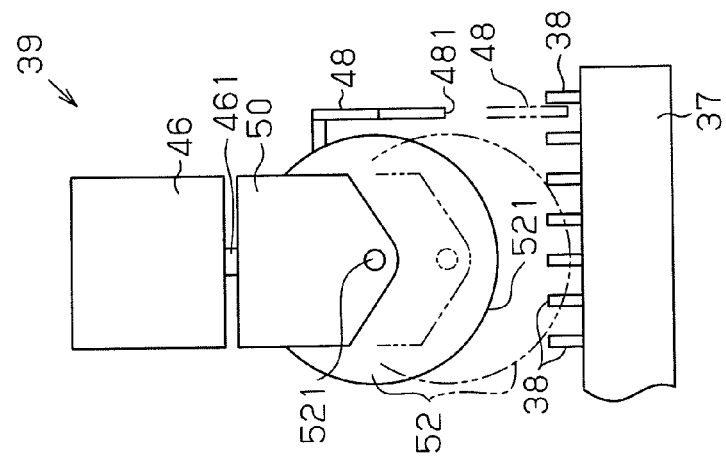
FIG. 8(b) is a partial side view illustrating the pressing device of FIG. 3(b)

After finishing the pressing operation against the fiber bundle F by the pressing bar 48 along the row Y1, the guide pipe 31 moves to engage the fiber bundle F with the remaining ones of the pins 38 forming the row Y2 except the predetermined pins 38. When engagement of the fiber bundle F with all the predetermined pins 38 among the pins 38 forming the row Y2 is completed, the pressing device 39 is placed at the standby position shown in FIG. 8(b) by the operation of the linear sliders 12, 13 such that the pressing edge 481 of the pressing bar 48 is located in the vicinity of the inner side of the pins 38 forming the row Y2. When the pressing device 39 is arranged at the standby position shown in FIG. 8(b), the base frame 43 is arranged at an appropriate height by the operation of the motor 41. Thereafter, the electromagnetic three-way valve 53 is energized, and the pressing bar 48 moves downward. Then, the pressing edge 481 presses the straight parts Fx of the fiber bundle F engaged with the pins 38 forming the row Y2 toward the roots of the pins 38. The states shown by the chain double-dashed line in FIGS. 8(a) and 8(b) are the states where the pressing bar 48 presses the fiber bundle F along the row Y2. The position of the pressing bar 48 shown by the chain double-dashed line in FIG. 8(a) is the pressing position where the fiber bundle F is pressed. Thereafter, the electromagnetic three-way valve 53 is de-energized so that the pressing bar 48 moves upward to the retracted position. The pressing bar 48 at the retracted position is shown by the solid line in FIG. 8(a).

Figure 6B:
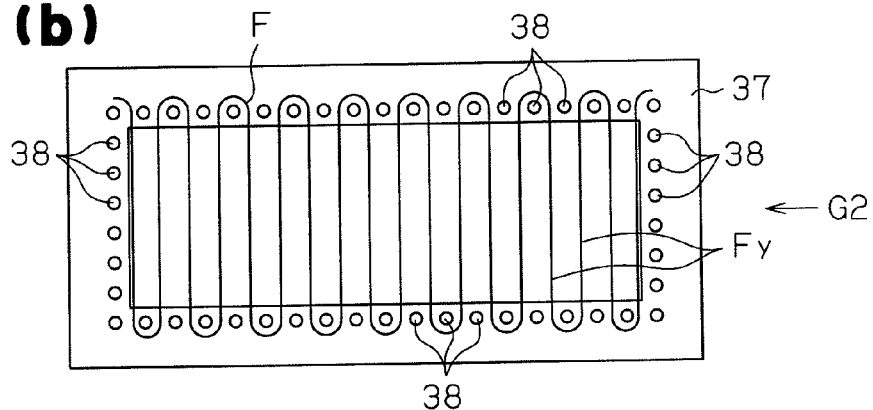

FIG. 6(b) shows the arranging pattern in which the fiber bundle F is arranged by moving the guide pipe 31 in the Y-axis direction, and then reversing the movement of the guide pipe 31 to engage the fiber bundle F with the pins 38 in the rows X1, X2. When the fiber bundle F is engaged with all the predetermined pins 38 among the pins 38 in the rows X1, X2, formation of a fiber bundle layer G2 in the arranging pattern shown in FIG. 6(b) is completed.

When formation of the fiber bundle layer G2 in the arranging pattern of FIG. 6(b) is performed to proceed from the row Y2 to the row Y1, the base frame 43 is first arranged at an appropriate height by the operation of the motor 41. Thereafter, the electromagnetic three-way valves 54, 55 are energized so that the press rollers 51, 52 move downward. As the first movable bodies 121, 131 and the linear slider 14 move from the row Y2 toward the row Y1, the press rollers 51, 52 pass along the inner side of the pins 38 in the rows X1, X2, on which the fiber bundle F is engaged, in the arrangement direction (X-axis direction) of the pins 38 in the rows X1, X2. That is, a peripheral portion 512 of the press roller 51 (shown in FIG. 3(a)) and a peripheral portion 522 (shown in FIG. 8(b)) of the press roller 52 sequentially intersect the straight parts Fy (shown in FIG. 6(b)) of the fiber bundle F engaged with the pins 38. The peripheral portion 512 of the press roller 51 and the peripheral portion 522 of the press roller 52 are located in the front of the press rollers 51, 52 in the moving direction, and include a pressing portion that is inclined such that, toward the end in the moving direction, the distance from the roots of the pins 38 in the laminating direction (Z-axis direction) of the fiber bundle layers increases.

The straight parts Fy of the fiber bundle F engaged with the pins 38 in the row X1 are sequentially pressed toward the roots of the pins 38 as the press roller 51 is rotated, and the straight parts Fy of the fiber bundle F engaged with the pins 38 in the row X2 are sequentially pressed toward the roots of the pins 38 as the press roller 52 is rotated. The linear slider 14 moves from the row Y2 to the row Y1 until the press rollers 51, 52 pass along the inner side of all the pins 38 in the rows X1, X2 on which the fiber bundle F is engaged.

The linear sliders 12, 13, which move the linear slider 14 in the X-axis direction, configure a first moving device, which moves the press rollers 51, 52 in the arrangement direction (X-axis direction) of the pins 38 and causes the press rollers 51, 52 to perform pressing operation.

The state shown by the chain double-dashed line in FIGS. 9(a) and 9(b) is the pressing state of the press rollers 51, 52 along the rows X1, X2. The position of the press rollers 51, 52 shown by the chain double-dashed line in FIG. 9(a) is the pressing position where the fiber bundle F is pressed. Thereafter, the electromagnetic three-way valves 54, 55 are de-energized so that the press rollers 51, 52 move upward to the retracted position. The press rollers 51, 52 at the retracted position are shown by the solid line in FIG. 9(a).

When formation of the fiber bundle layer G2 in the arranging pattern shown in FIG. 6(b) is performed to proceed from the row Y1 to the row Y2, the base frame 43 is first arranged at an appropriate height by the operation of the motor 41. Subsequently, the electromagnetic three-way valves 54, 55 are energized and de-energized in the same manner as when the formation of the fiber bundle layer G2 proceeds from the row Y2 to the row Y1, and the linear slider 14 moves from the row Y1 toward the row Y2.

Figure 6C:
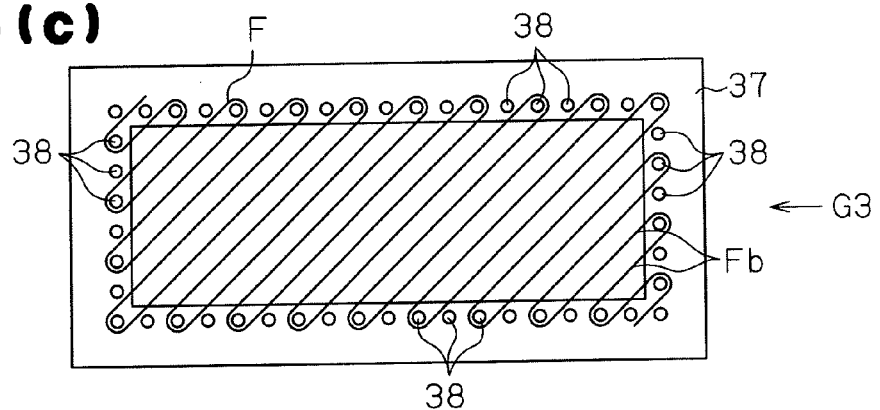
Figure 6D:
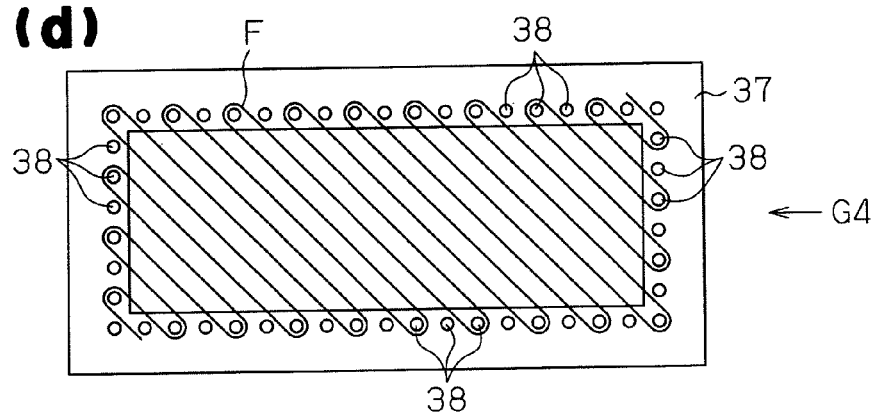

FIG. 6(c) shows the arranging pattern in which the fiber bundle F is arranged by moving the guide pipe 31 in the bias direction (diagonal direction), and then reversing the motion of the guide pipe 31 such that the fiber bundle F is engaged with the pins 38. When the fiber bundle F is engaged with all the predetermined pins 38 among the pins 38 in the rows X1, X2 in the X-axis direction, and all the predetermined pins 38 among the pins 38 in the rows Y1, Y2 in the Y-axis direction, the formation of a fiber bundle layer G3 in the arranging pattern shown in FIG. 6(c) is completed.

When formation of the fiber bundle layer G3 in the arranging pattern shown in FIG. 6(c) is performed to proceed from the row Y2 to the row Y1, the base frame 43 is first arranged at an appropriate height by the operation of the motor 41. Thereafter, the electromagnetic three-way valves 54, 55 are energized so that the press rollers 51, 52 move downward. When the fiber bundle F is engaged with all the predetermined pins 38 among the pins 38 in the row Y2, the pressing device 39 is moved to the standby position shown in FIG. 8(b) by the operation of the linear sliders 12, 13 such that the pressing edge 481 of the pressing bar 48 is located in the vicinity of the inner side of the pins 38 in the row Y2. When the pressing device 39 is arranged at the standby position shown in FIG. 8(b), the base frame 43 is arranged at an appropriate height by the operation of the motor 41. Subsequently, the electromagnetic three-way valve 53 is energized so that the pressing bar 48 moves downward. Then, the pressing edge 481 presses the straight parts Fb of the fiber bundle F engaged with the pins 38 in the row Y2 toward the roots of the pins 38. Thereafter, the electromagnetic three-way valve 53 is de-energized so that the pressing bar 48 moves upward.

When the fiber bundle F is engaged with all the predetermined pins 38 among the pins 38 in the row Y1, the pressing device 39 is arranged at the standby position shown in FIG. 7(b) by the operation of the linear slider 12, 13 such that the pressing edge 481 of the pressing bar 48 is located in the vicinity of the inner side of the pins 38 in the row Y1. When the pressing device 39 is arranged at the standby position shown in FIG. 7(b), the base frame 43 is arranged at an appropriate height by the operation of the motor 41. Subsequently, the electromagnetic three-way valve 53 is energized so that the pressing bar 48 moves downward. Accordingly, the pressing edge 481 presses the straight parts Fb of the fiber bundle F engaged with the pins 38 in the row Y1 toward the roots of the pins 38. Thereafter, the electromagnetic three-way valves 53, 54, 55 are de-energized so that the pressing bar 48 and the press rollers 51, 52 move upward.

When formation of the fiber bundle layer G3 in the arranging pattern shown in FIG. 6(c) is performed to proceed from the row Y1 to the row Y2, the base frame 43 is first arranged at an appropriate height by the operation of the motor 41. Subsequently, the electromagnetic three-way valves 54, 55 are energized so that the press rollers 51, 52 move downward. When the fiber bundle F is engaged with all the predetermined pins 38 among the pins 38 in the row Y1, the pressing device 39 is moved to the standby position shown in FIG. 7(b) by the operation of the linear sliders 12, 13 such that the pressing edge 481 of the pressing bar 48 is located in the vicinity of the inner side of the pins 38 in the row Y1. When the pressing device 39 is arranged at the standby position shown in FIG. 7(*b*), the base frame 43 is arranged at an appropriate height by the operation of the motor 41. Subsequently, the electromagnetic three-way valve 53 is energized so that the pressing bar 48 moves downward. Accordingly, the pressing edge 481 presses the straight parts Fb of the fiber bundle F engaged with the pins 38 in the row Y1 toward the roots of the pins 38. Thereafter, the electromagnetic three-way valve 53 is de-energized so that the pressing bar 48 moves upward.

When the fiber bundle F is engaged with all the predetermined pins 38 among the pins 38 in the row Y2, the pressing device 39 is moved to the standby position shown in FIG. 8(*b*) by the operation of the linear sliders 12, 13 such that the pressing edge 481 of the pressing bar 48 is located in the vicinity of the inner side of the pins 38 in the row Y2. When the pressing device 39 is arranged at the standby position shown in FIG. 8(*b*), the base frame 43 is arranged at an appropriate height by the operation of the motor 41. Subsequently, the electromagnetic three-way valves 53 is energized so that the pressing bar 48 moves downward. Accordingly, the pressing edge 481 presses the straight parts Fb of the fiber bundle F engaged with the pins 38 in the row Y2 toward the roots of the pins 38. Thereafter, the electromagnetic three-way valve 53 is de-energized so that the pressing bar 48 moves upward. Then, the linear slider 14 moves from the row Y1 toward the row Y2 until the press rollers 51, 52 pass the inner side of all the pins 38 in the rows X1, X2 on which the fiber bundle F is engaged. Thereafter, the electromagnetic three-way valves 54, 55 are de-energized so that the press rollers 51, 52 move upward.

FIG. 6(*d*) shows the arranging pattern in which the fiber bundle F is arranged by moving the guide pipe 31 in the bias direction (diagonal direction) that is perpendicular to the bias direction (diagonal direction) of FIG. 6(*c*), and then reversing the motion of the guide pipe 31 to engage the fiber bundle F with the pins 38. When the fiber bundle F is engaged with all the predetermined pins 38 among the pins 38 in the rows X1, X2 in the X-axis direction, and all the predetermined pins 38 among the pins 38 in the rows Y1, Y2 in the Y-axis direction, formation of a fiber bundle layer G4 in the arranging pattern of FIG. 6(*d*) is completed. The pressing operation performed by the pressing device 39 associated with formation of the fiber bundle layer G4 of FIG. 6(*d*) is executed in the same manner as the case of FIG. 6(*c*).

The air cylinder 44 and the electromagnetic three-way valve 53 configure a pressing bar switching device, which switches the pressing bar 48 between the retracted position and the pressing position. The air cylinder 45 and the electromagnetic three-way valve 54 configure a press roller switching device that switches the press roller 51 between the retracted position and the pressing position. The air cylinder 46 and the electromagnetic three-way valve 55 configure a press roller switching device that switches the press roller 52 between the retracted position and the pressing position.

Figure 12:
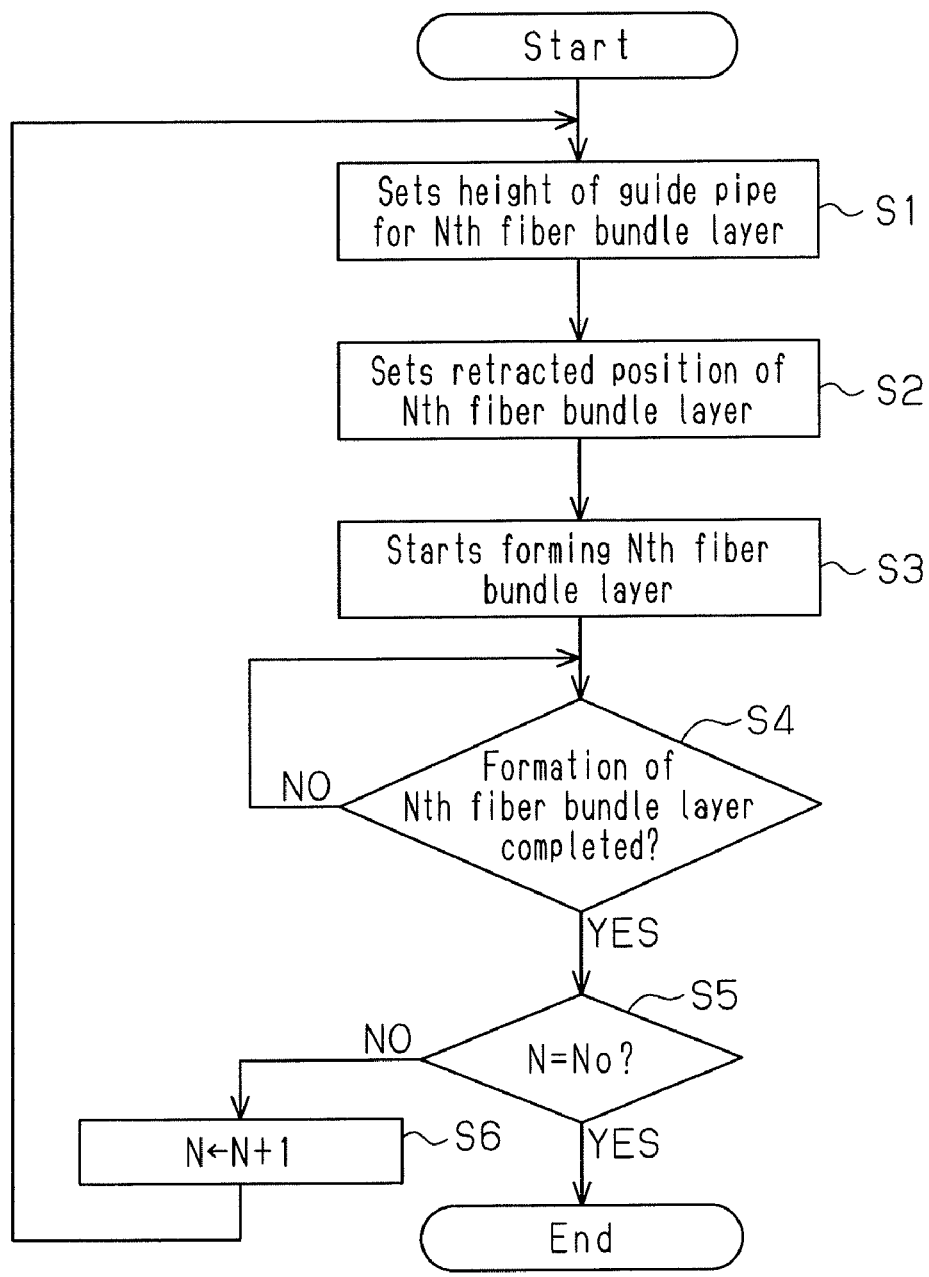
FIG. 12 is a flowchart showing a pressing position control program.

When forming the fiber bundle layers, the control computer C controls the pressing position of the press rollers 51, 52 based on a pressing position control program shown in the flowchart of FIG. 12. The method for controlling the pressing position of the press rollers 51, 52 in accordance with the flowchart of FIG. 12 will now be described.

When forming an Nth fiber bundle layer (N is an integer greater than or equal to one) (one of the fiber bundle layers G1, G2, G3, and G4 shown in FIGS. 6(*a*), 6(*b*), 6(*c*), and 6(*d*)), the control computer C first operates the motor 27 and sets the height of the guide pipe 31 (step S1). Then, the control computer C operates the motor 41 and sets the retracted positions of the pressing bar 48 and the press rollers 51, 52 (step S2). FIG. 10(*a*) shows the state where the pressing bar 48 and the press rollers 51, 52 (only the press roller 52 is shown) are at the initial retracted position (N=1). After the retracted positions of the pressing bar 48 and the press rollers 51, 52 are set, the control computer C starts forming the Nth fiber bundle layer (step S3). FIG. 10(*b*) shows the state where the pressing bar 48 and the press rollers 51, 52 (only the press roller 52 is shown) are at the initial pressing position (N=1).

The control computer C determines whether formation of the Nth fiber bundle layer is finished (step S4). When the formation of the Nth fiber bundle layer is finished, the control computer C determines whether N is equal to the last lamination number No (an integer greater than or equal to two) of the fiber bundle layers (step S5). If N is not equal to No, the control computer C sets N+1 to N (step S6), and proceeds to step S1. If N is equal to No, the control computer C stops forming the fiber bundle layer.

When proceeding from step S6 to step S1, the control computer C sets the height of the guide pipe 31 for the next (N+1)th fiber bundle layer, and subsequently sets the retracted positions of the pressing bar 48 and the press rollers 51, 52 for the (N+1)th fiber bundle layer. That is, the motor 27 is operated so that the guide pipe 31 moves upward by a predetermined amount, and the motor 41 is operated so that the pressing bar 48 and the press rollers 51, 52 move upward by a predetermined amount. Then, the control computer C starts forming the (N+1)th fiber bundle layer.

Figure 11:
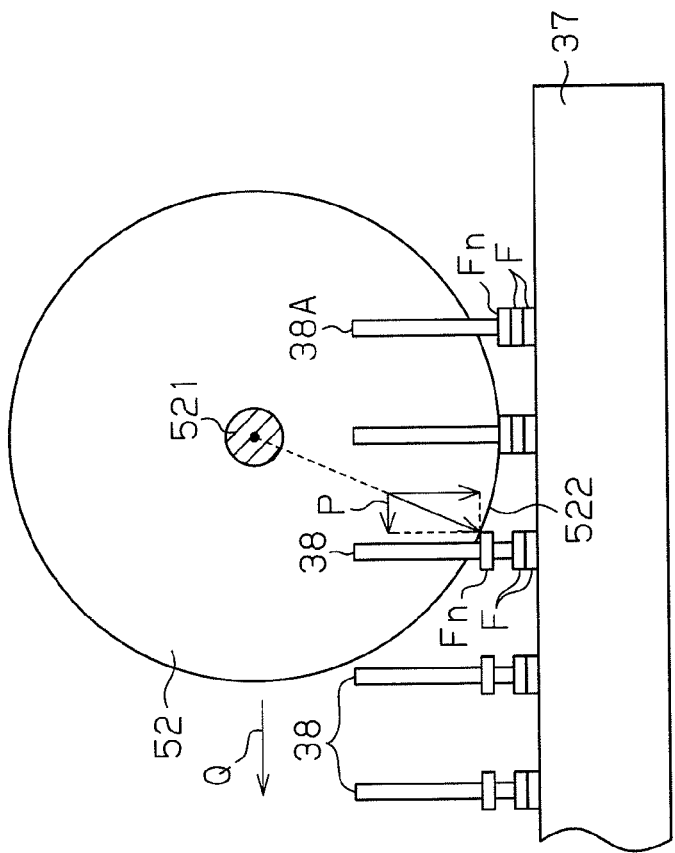
FIGS. 11(a) and 11(b) are enlarged partial side views illustrating the pressing device.
Figure 11:
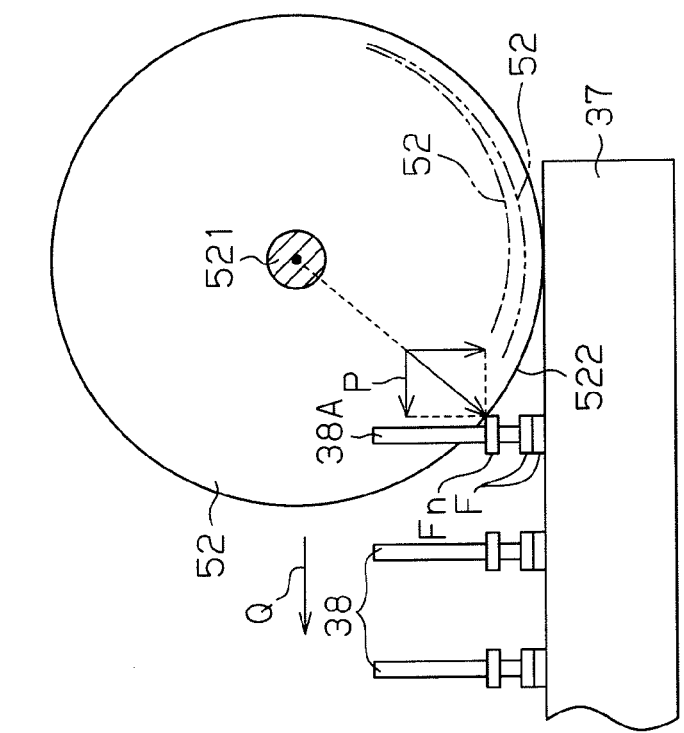

FIG. 11(*a*) shows a case where the press rollers 51, 52 (only the press roller 52 is shown) proceed in the direction of arrow Q while being arranged at the pressing position shown by the solid line, and a fiber bundle Fn engaged with the pin 38A located on one end of the pins 38 of the row X1(X2) in the X-axis direction is pressed in the vicinity of the pin 38A for the first time. In this case, the first fiber bundle layer depressed by the press rollers 51, 52, which is the fiber bundle Fn for the Nth fiber bundle layer, contacts part of the circumferential surface of the press rollers 51, 52 other than the lower most part. In this case, the fiber bundle Fn receives pressing force in the lateral direction (X-axis direction) (shown by arrow P). When the integer N is increased, the pressing force P is also increased. If the pressing force P is excessive, great load is applied to the pin 38A in the lateral direction. As a result, the pin 38A is bent. As shown in FIG. 11(*b*), when the press rollers 51, 52 get on the pressed fiber bundle Fn, the pressing force P corresponding to the subsequently pressed fiber bundle Fn becomes smaller than the pressing force P corresponding to the fiber bundle Fn engaged with the first pin 38A. As a result, the pins 38 other than the pin 38A are not bent.

The extending amount of the drive rod 441 of the air cylinder 44 is constant, and the extending amounts of the drive rods 451, 461 of the air cylinders 45, 46 are constant and equal to each other. In the present embodiment, the changing amount of the retracted positions of the pressing bar 48 and the press rollers 51, 52 every time the formation of one fiber bundle layer is finished is constant. Thus, the changing amounts of the pressing position of the pressing bar 48 and the press rollers 51, 52 every time the formation of one fiber bundle layer is finished are constant and equal to each other. Also, the changing amount of the height of the guide pipe 31 is also constant.

The initial pressing position of the pressing bar 48 and the press rollers 51, 52, and the changing amount of the pressing position are selected as required such that great lateral load is not applied to the pins 38 on which the row of the fiber bundle F pressed by the press rollers 51, 52 is engaged. Thus, the pins 38 are not bent by the pressing operation of the press rollers 51, 52. In FIG. 11(a), the chain double-dashed line shows one example of the first pressing position of the press roller 52 for the first fiber bundle layer, which is the Nth fiber bundle layer, and the dashed line shows one example of the second pressing position of the press roller 52 for the second fiber bundle layer, which is the (N+1)th fiber bundle layer.

The motor 41, the threaded shaft 411, and the nut 42 configure a first adjustment part and a second adjustment part.

The first embodiment has the following advantages.

(1) The straight parts Fy, Fb of the fiber bundle F engaged with the pins 38 in the rows X1, X2 are depressed toward the roots of the pins 38 by the press rollers 51, 52, which roll along the rows X1, X2. The press rollers 51, 52, which move along the rows of the pins 38, are small as compared to the conventional pressing member, which does not move while pressing. As a result, the size of the pressing device 39 is reduced. The press rollers 51, 52, which move while rolling on the fiber bundle layers, are suitable as the pressing member that press the fiber bundle without rubbing.

(2) The press rollers 51, 52 move in the direction of the rows of the pins 38 (X-axis direction) so as to follow the pins 38 with which the fiber bundle F has been engaged. Thus, the fiber bundle F is pressed by the press rollers 51, 52 in at least part of the period during which the fiber bundle is arranged to form one fiber bundle layer. As a result, the time for forming the fiber bundle layer including the pressing operation is reduced from the case of the conventional fiber bundle arranging device in which the press rollers 51, 52 are not used.

(3) Every time the fiber bundle layer is laminated, the pressing position of the press rollers 51, 52 is adjusted by the operation of the motor 41. Thus, the force that presses the fiber bundle F in the lateral direction (X-axis direction) does not become excessive when depressing the fiber bundle F by the press rollers 51, 52. As a result, although the straight parts Fy, Fb of the fiber bundle F engaged with the pins 38 are pressed by the press rollers 51, 52, the pins 38 are not bent.

(4) If the pressing position of the press rollers 51, 52 is not adjusted, the diameter of the press rollers 51, 52 needs to be increased to reduce the lateral force applied to the fiber bundle F that is depressed by the pressing operation. With the configuration in which the pressing position of the press rollers 51, 52 is adjusted every time the fiber bundle layer is laminated, the diameter of the press rollers 51, 52 is reduced. As a result, the weight of the pressing device 39 is reduced.

(5) Since two press rollers 51, 52 move along the parallel rows X1, X2 while rolling, the time required for forming the fiber bundle layer including the pressing operation is reduced as compared to the case where only one press roller is used.

(6) If the pressing member that does not move during pressing like the pressing bar 48 is used instead of the press rollers 51, 52, the weight of the member moved by the linear sliders 12, 13, 14 is increased, which increases the power needed to form the fiber bundle layers. The employment of the press rollers 51, 52 reduces the weight of the member moved by the linear sliders 12, 13, 14.

(7) The press rollers 51, 52 and the guide pipe 31 are moved in the X-axis direction by the operation of the linear sliders 12, 13. The linear sliders 12, 13, which move the guide pipe 31 in the X-axis direction, also function as a device for moving the press rollers 51, 52. The configuration of the fiber bundle arranging device 10 is simplified by using the first moving device also as the X-axis moving part.

(8) When pressing the fiber bundle by the press rollers instead of the pressing bar 48, time required for forming the fiber bundle layer including the pressing operation is extended by the amount of time required for rolling the press rollers along the rows Y1, Y2 in the Y-axis direction. The configuration including the pressing bar 48 and the press rollers 51, 52 like the present embodiment reduces the time required for forming the fiber bundle layer including the pressing operation as compared to the case in which the straight parts Fx, Fy, Fb of the fiber bundle F engaged with the pins 38 in two rows that are perpendicular to each other (rows X1, X2 and rows Y1, Y2) are pressed with only press rollers.

(9) In terms of the physical properties of the three-dimensional fiber structure, the fiber density of all the fiber bundle layers is preferably even. Every time the fiber bundle layer is laminated, the pressing position of the pressing bar 48 and the press rollers 51, 52 is adjusted by the operation of the motor 41. Thus, the fiber density of all the fiber bundle layers is substantially even. Also, the structure in which the pressing position of the pressing bar 48 and the press rollers 51, 52 is adjusted by only the motor 41 simplifies the structure of the fiber bundle arranging device 10.

The above-mentioned embodiment may be modified as follows.

One of the press rollers (for example, the press roller 52) of the pressing device 39 may be omitted, and the pressing device 39 may rotate about the Z axis by 180° from the state of FIG. 1(a). In this case, the remaining press roller (for example, the press roller 51) moves along the row X1 while rolling in the state of FIG. 1(a), and when the entire pressing device 39 is rotated about the Z axis by 180° from the state of FIG. 1(a), the remaining press roller (for example, the press roller 51) moves along the row X2 while rolling.

The two press rollers 51, 52 may be moved in the Z-axis direction by a single air cylinder.

The press rollers 51, 52 may be vertically moved by a ball screw mechanism driven by a motor.

The pressing bar 48 may press the fiber bundle along the rows X1, X2, and the press rollers 51, 52 may move along the rows Y1, Y2 while rolling.

The fiber bundle may be pressed by the press rollers after one fiber bundle layer is formed.

Figure 13:
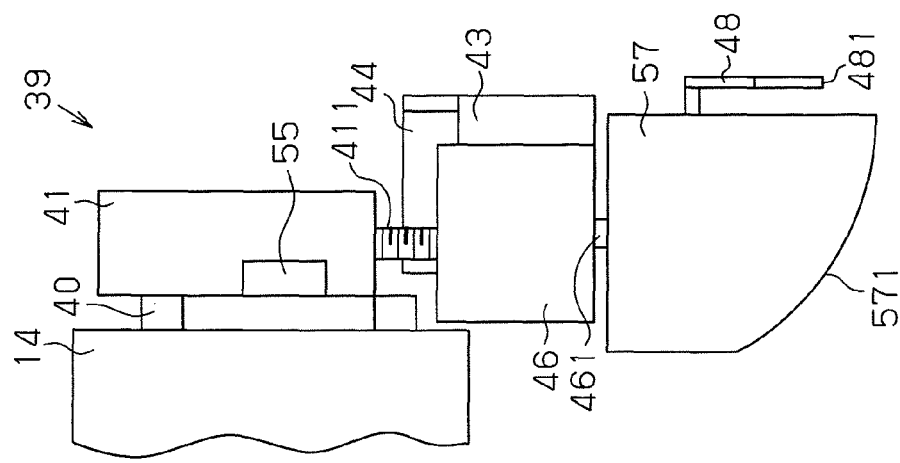
FIG. 13 is an enlarged partial side view illustrating a modified embodiment of the pressing device.
Figure 14:
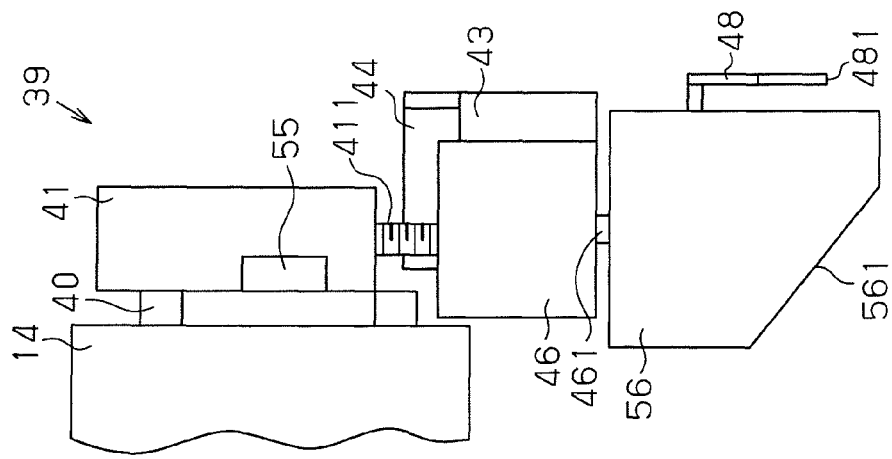
FIG. 14 is an enlarged partial side view illustrating another modified embodiment of the pressing device.

Instead of the press rollers, pressing members 56, 57 shown in FIGS. 13, 14 may be used. The pressing member 56 shown in FIG. 13 includes a linear pressing portion 561, which is inclined such that, toward the end in the moving direction, the distance from the roots of the pins in the lamination direction of the fiber bundle layers increases. The pressing member 57 shown in FIG. 14 includes a curved pressing portion 571, which is inclined such that, toward the end in the moving direction, the distance from the roots of the pins in the lamination direction of the fiber bundle layers increases.

The press rollers 51, 52 do not need to rotate.

The pins do not need to be arranged linearly, but may be arranged to describe a curve. In this case, the press rollers preferably move along the curve of the arrangement of the pins.

Instead of the guide pipe 31, for example, a member including a fork attached to the distal end of a rod may be used, and the fiber bundle may be guided by the fork.

The pressing member may have any structure as long as the pressing member at least includes a pressing portion inclined such that, toward the end in the moving direction, the distance from the roots of the pins in the lamination direction of the fiber bundle layers increases, and may further include another inclined portion formed to face in the different direction. For example, a member like a reversed conical member may be used as the pressing member.

The pressing portion does not need to be always inclined. For example, a pressing portion configured by a surface that is vertical at times other than when pressing is performed may be inclined only when pressing is performed.

The invention claimed is:

1. A fiber bundle arranging device for laminating a plurality of fiber bundle layers formed of a fiber bundle, the fiber bundle being engaged with a plurality of arranged pins to have straight parts, an arrangement direction of the pins being an X-axis direction, and a Y-axis direction being perpendicular to the X-axis direction, the fiber bundle arranging device comprising:
- a pressing member including a pressing portion, which depresses the straight parts of the fiber bundle engaged with the pins toward the roots of the pins in the vicinity of the pins;
- a guide member for guiding the fiber bundle;
- a moving device for moving the guide member, the moving device including an X-axis moving part and a Y-axis moving part,
- the X-axis moving part being configured to move the pressing member in the X-axis direction such that the pressing portion sequentially intersects the straight parts of the fiber bundle and to cause the pressing member to perform the pressing operation, the X-axis moving part including a first movable body, which moves linearly in the X-axis direction,
- the Y-axis moving part being supported by the first movable body and including a second movable body, which moves linearly in the Y-axis direction, and
- the guide member moving together with the combination of the movement of the first movable body and the movement of the second movable body,
- the pressing member being a flat member oriented perpendicular to the Y-axis direction, wherein the pressing portion is located at the front of the pressing member in the moving direction, and the pressing portion is moved to sequentially intersect the straight parts of the fiber bundle while being inclined such that, toward the front of the pressing member in the moving direction, the distance from the roots of the pins in the laminating direction of the fiber bundle layers increases,
- the pressing member being configured to move in the X-axis direction so as to follow the pins with which the fiber bundle has been engaged.

2. The fiber bundle arranging device according to claim 1, wherein the rows of the pins include two rows parallel to each other, and the fiber bundle arranging device further comprising two pressing members one of which is said pressing member, the two pressing members corresponding to the two rows.

3. The fiber bundle arranging device according to claim 1, wherein the rows of the pins include a first row and a second row perpendicular to each other, and the pressing member is provided corresponding to the first row, the fiber bundle arranging device further comprising:
- a pressing bar, which selectively depresses the fiber bundle engaged with the pins forming the second row toward the roots of the pins in the vicinity of the pins; and
- a pressing bar switching device, which switches the pressing bar between a retracted position and a pressing position.

4. The fiber bundle arranging device according to claim 1, further comprising a first adjustment part, which adjusts the pressing position of the pressing member.

5. The fiber bundle arranging device according to claim 4, wherein the rows of the pins include a first row and a second row perpendicular to each other, and the pressing member is provided corresponding to the first row, the fiber bundle arranging device further comprising:
- a pressing bar, which selectively depresses the fiber bundle engaged with the pins forming the second row toward the roots of the pins in the vicinity of the pins;
- a pressing bar switching device, which switches the pressing bar between a retracted position and a pressing position; and
- a second adjustment part, which adjusts the pressing position of the pressing bar.

6. The fiber bundle arranging device according to claim 5, further comprising a base frame supporting both of the pressing member and the pressing bar, wherein the second adjustment part is configured to adjust a height of the base frame to adjust both of the pressing positions of the pressing member and the pressing bar so that the second adjustment part also functions as the first adjustment part.

7. The fiber bundle arranging device according to claim 1, wherein the pressing member is a press roller.

* * * * *